(12) United States Patent
Bliss et al.

(10) Patent No.: US 8,032,232 B2
(45) Date of Patent: *Oct. 4, 2011

(54) NATIVELY RETAINING PROJECT DOCUMENTATION IN A CONTROLLER

(75) Inventors: Ronald E. Bliss, Twinsburg, OH (US); Douglas W. Reid, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/789,205

(22) Filed: May 27, 2010

(65) Prior Publication Data

US 2010/0241244 A1 Sep. 23, 2010

Related U.S. Application Data

(63) Continuation of application No. 11/535,408, filed on Sep. 26, 2006, now Pat. No. 7,729,786.

(51) Int. Cl.
G05B 11/01 (2006.01)
G06F 9/44 (2006.01)

(52) U.S. Cl. .......................................... 700/18; 717/123
(58) Field of Classification Search .................... 700/18; 717/101–103, 170–173, 123
See application file for complete search history.

(56) References Cited

U.S. PATENT DOCUMENTS

| | | | |
|---|---|---|---|
| 4,488,258 A | 12/1984 | Struger et al. | |
| 5,404,288 A | 4/1995 | McDunn | |
| 5,943,675 A | 8/1999 | Keith et al. | |
| 6,446,202 B1 | 9/2002 | Krivoshein | |
| 6,449,715 B1 | 9/2002 | Krivoshein | |
| 6,701,284 B1 | 3/2004 | Huntley et al. | |
| 7,058,693 B1* | 6/2006 | Baker, Jr. | 709/217 |
| 7,103,506 B2 | 9/2006 | Friedrich et al. | |
| 7,729,786 B2* | 6/2010 | Bliss et al. | 700/18 |
| 2002/0049775 A1 | 4/2002 | Friedrich et al. | |
| 2002/0059348 A1 | 5/2002 | Lee et al. | |
| 2002/0191002 A1 | 12/2002 | Friedrich et al. | |
| 2002/0198971 A1* | 12/2002 | Resnick et al. | 709/221 |
| 2004/0133753 A1* | 7/2004 | Fulton et al. | 711/155 |
| 2011/0029103 A1* | 2/2011 | Mann et al. | 700/83 |

OTHER PUBLICATIONS

Non-Final OA dated Jun. 18, 2008 for U.S. Appl. No. 11/535,408, 20 pages.
OA dated Oct. 28, 2008 for U.S. Appl. No. 11/535,408, 11 pages.
OA dated May 26, 2009 for U.S. Appl. No. 11/535,408, 20 pages.
Final OA dated Oct. 23, 2009 for U.S. Appl. No. 11/535,408, 15 pages.
S. Heath, "Embedded Systems Design", Newnes—Elsevier Science, 2003. pp. 321-338.
International Search Report dated Dec. 23, 2009 for EP Application Serial No. 07116823.1, 4 pages.

* cited by examiner

*Primary Examiner* — Ryan Jarrett
(74) *Attorney, Agent, or Firm* — Turocy & Watson LLP; R. Scott Speroff; John M. Miller

(57) ABSTRACT

An industrial controller comprises a processing component and a memory that comprises logic code that is executable by the processing component. The memory further comprises documentation associated with the logic code and other control components, wherein the documentation is stored in a native form to enable individualized access to a portion of the documentation to an accessing entity. For example, the documentation can comprise one or more of descriptive text relating to a rung of ladder logic, a text box associated with a portion of the sequential function chart, a text box associated with a function block diagram, and embedded descriptive text within structured text.

18 Claims, 11 Drawing Sheets

NATIVELY RETAINING PROJECT DOCUMENTATION IN A CONTROLLER

RELATED APPLICATIONS

This application is a continuation of U.S. patent application Ser. No. 11/535,408 filed on Sep. 26, 2006 and entitled "NATIVELY RETAINING PROJECT DOCUMENTATION IN A CONTROLLER," the entirety of which is incorporated herein by reference.

TECHNICAL FIELD

The claimed subject matter relates generally to industrial control, and, more particularly, to retaining project information within an industrial controller.

BACKGROUND

Industrial controllers are special-purpose computing devices utilized to automate real-world tasks with precision and efficiency. For instance, industrial controllers are utilized on manufacturing lines to aid in creation and packaging of a product. For example, industrial controllers are utilized in the manufacture of automobiles, creation of consumables (such as pharmaceuticals, food products, etc.), bottling of beverages, and any other suitable manufacturing task. To effectuate automation of such tasks, controllers are designed to receive input from sensors that are communicatively coupled to thereto and drive actuators that are also communicatively coupled thereto. More particularly, an industrial controller executes application specific code that is contained therein, wherein decisions are made based upon contents of the code as well as status of sensors and actuators coupled to the controller. Due to time-sensitivity associated with many manufacturing environments, industrial controllers can monitor sensors, scan code, and drive actuators quite expediently (e.g., near real-time).

As stated above, an industrial controller must be associated with code that causes the controller to act in a desirable manner given certain sensor and/or actuator states. Conventionally, such application code is written by a programmer and stored within a project file on a computer. The project file includes control system hardware configuration, definitions for data variables, and executable code. In order to simplify the management of the executable code the project file generally provides a facility to break the code into smaller more manageable components and provide a scheduling mechanism to determine when each module of code is to be executed by the controller. Throughout the project the programmer can associate text or description with various project components. For example, a project to be executed within an industrial controller can include numerous data variables, I/O modules, tasks, programs, routines, instructions and the like, and descriptive text can be associated with each of the aforementioned components, such that a programmer or user who later reviews the project can determine what a portion of the project is for and how such portion is operating.

Conventionally, the descriptive text is retained within a project file on a personal computer. When it is desirable for the project to execute within the controller, the personal computer can be coupled to the industrial controller by way of any suitable communications link, and the personal computer undertakes process of compiling, linking, and loading the project's hardware configuration, data variable definitions and source code onto the controller. If a programmer does not have the project file at hand, the controller's contents can be uploaded from the controller; however, the resulting uploaded project does not include data variable names, description regarding functionality, and/or other important descriptive information. In other words, a project without descriptive information can be so cryptic that it is not readily comprehendible by a programmer.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Briefly described, the subject disclosure pertains to enabling code/project documentation to be stored directly within memory of an industrial controller, such that particular components of the documentation can be individually accessed. Industrial controllers are configured to execute logic code, including but not limited to ladder diagram (LD), sequential function charts (SFC), function block diagrams (FBD), and/or structured text (ST). In conventional controllers, code such as the aforementioned is compiled and linked to data memory addresses within the controller, and the controller can then execute such code. Documentation that describes such code, however, is separated from the logic, such that an individual without an updated project file may not have suitable information to perform diagnostics with respect to the code. The documentation can include, but is not limited to variable or tag descriptions, user-defined type descriptions, address comments, rung comments, text boxes, task/program/routine descriptions, report formatting, custom add-in instruction help text, graphical components, and embedded web (HTML) pages. Accordingly, by storing project documentation natively within memory of a controller, an individual that does not have a copy of a project file can upload source code and documentation associated therewith from memory of the controller to a personal computer, thereby obtaining an up-to-date project with full documentation. Additionally, individuality of each piece of documentation with respect to the project file can be retained, such that a particular portion or portion(s) of documentation can be accessed directly.

In another aspect, when documentation retained within a controller is altered, devices that are communicatively coupled to such controller can be notified of the alterations and/or automatically updated with respect to the alterations. More particularly, alterations can be pushed to the controller, and the controller can subsequently provide notifications to devices accessing the controller that alterations have been undertaken with respect to the documentation. Therefore, project files can be kept current on multiple computers accessing the controller.

In accordance with another aspect, documentation retained natively upon an industrial controller can be programmatically accessed and utilized in a control operation. For instance, strings of text can be extracted from documentation stored upon the controller and utilized as part of a control system. For instance, descriptive text can be provided to a display as part of an alarm message and/or to send to a manufacturing execution system (MES) database. Still further, a human-machine interface (HMI) generator can read text strings and utilize such text strings to display information relating to a control system.

To the accomplishment of the foregoing and related ends, certain illustrative aspects are described herein in connection with the following description and the annexed drawings. These aspects are indicative, however, of but a few of the various ways in which the principles of the invention can be employed and such subject matter is intended to include all such aspects and their equivalents. Other advantages and novel features will become apparent from the following detailed description when considered in conjunction with the drawings.

DETAILED DESCRIPTION

Figure 1:
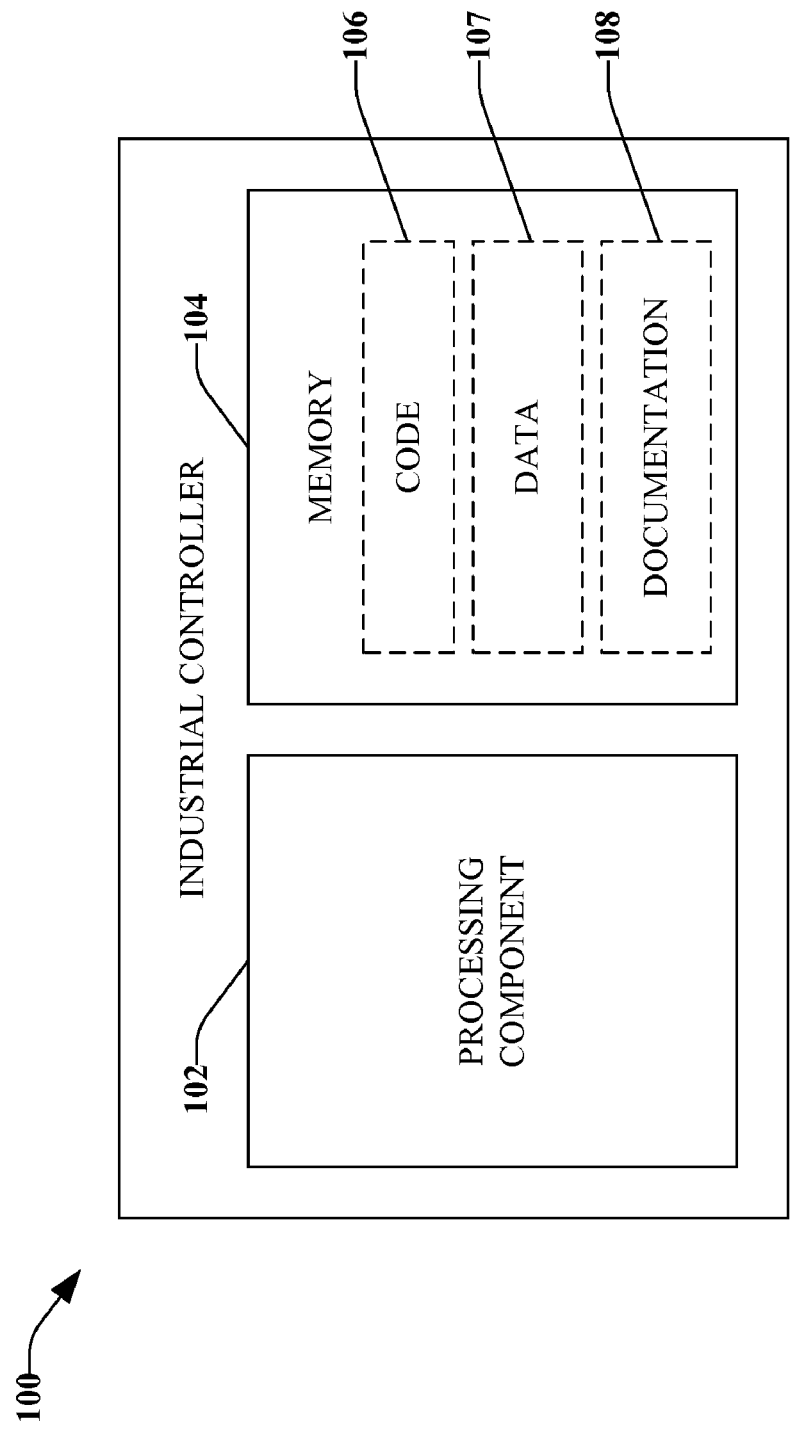
FIG. 1 illustrates an example industrial controller that can natively retain project documentation within memory thereof.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer or controller related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer/controller and/or distributed between two or more computers/controllers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to the drawings, FIG. 1 illustrates an industrial controller 100 that can natively retain descriptive documentation relating to a project that is executable by the controller 100. A project can include, but is not limited to, a hardware configuration, application code, data values, names, documentation, etc. The industrial controller 100 includes a processing component 102 that can execute instructions that are retained within a memory 104. Pursuant to an example, the memory 104 can include executable code 106, wherein source code with respect to which the executable code is based upon may be written by way of ladder logic, a function block diagram, a sequential function chart, structured text, and/or any other suitable textual and/or graphical language that can be utilized in connection with programming industrial controllers. Such source code can additionally include comments that describe data variables used by the source code, functionality of certain portions of source code (such as comments associated with a rung of ladder logic, text boxes related to a sequential function chart and/or function block diagram, text strings embedded within structured text).

Conventionally, when a program is created for an industrial controller, memory is allocated such that data variables are retained therein and the application program is structured in a particular manner. For instance, certain tasks or modules can trigger execution of another module, routine, and/or the like. Typically, each routine/module/task/component is associated with names as well as text that describes the functionality and/or purpose of the routine/module/task/component. Additionally, data variables used by the code 106 can be assigned by allocating a particular area of memory and then using a memory address as part of a program. In some embodiments, a name can be assigned to a particular portion of memory associated with a data variable, and such name can be utilized when writing code that is to be executed by the processing component 102 within the industrial controller 100. Accordingly, a data region 107 within the memory 104 can include, amongst other things, hardware configuration, names relating to tags, variables, components, etc., and such data region 107 can be accessed when executing at least a portion of the code 106. As stated above, text that is descriptive of the variables can also be included within the project, such that when the application code is reviewed for diagnostic purposes a reviewer will be able to understand the operation. The descriptive text can be particularly important with respect to custom data layouts or structures (user-defined types), as without descriptive text a subsequent user would be unable to determine operating parameters of the custom layouts or structures.

Conventionally, text that describes code, variables, and/or the like is retained in a project file on a computing device that can be coupled to the industrial controller 100. When it is desirable for the project to execute within the controller 100, the personal computer can be coupled to the industrial controller 100 through utilization of any suitable link, and the personal computer can undertake compiling, linking, and loading hardware configuration of the project, data associated with the project, and code of the project into the industrial controller 100. Thus, executable code resides within the memory 104 of the controller 100 while, conventionally, descriptive text and other suitable documentation is maintained upon the personal computer. This separation of executable code and documentation is not problematic if only a single programmer is accessing and modifying code executed by the industrial controller 100. If, however, several users desire access to a project file for modification then various problematic issues can arise.

With more specificity, in conventional industrial controllers, when a programmer desires to perform modifications with respect to a project file associated with a controller, the programmer must have access to the source code. If the programmer does not have such access, source code can be uploaded from a controller but the recipient would not be provided with documentation relating to such code (and in some instances, no variable names are provided). The resultant source code without documentation (including descriptive text) is oftentimes so cryptic that it cannot be comprehended without undue effort on the part of a programmer. Even if the programmer does have access to the source code, the programmer must couple to a controller to upload data within the controller and merge components/routines/tasks, etc back into the source code so that documentation is re-associated with uploaded code. Such an upload and merge process is cumbersome and can be associated with errors. For instance, a line of code can be skipped, thereby causing textual description to be incorrectly linked.

Moreover, bifurcation of executable code from documentation associated therewith can result in inconsistencies between code resident upon a controller and source code resident upon a personal computer. More particularly, in many systems more than one designer may be making modifications to a project file at a single instance in time. Conventionally, only one person is allowed access to a project file at once so as to aid in avoiding overwrite of particular code. To enable two or more designers to work on a project file, copies of the project file are provided to all designers who can then access the controller from the copies, such that both designers are accessing the controller and making changes to code associated with the project file, data variables related to the project file, documentation related to the project file, etc. Thus, two or more designers have two inconsistent copies of a project file. Documentation and code associated with the copies of the project file can be merged (e.g., through exportation to a comma separated text file) and imported back into a "master" project file. As can be understood, however, the master project file can quickly become obsolete, as designers frequently access and modify information stored therein.

These and other deficiencies can be overcome through utilization of the industrial controller 100, as the memory 104 of the controller 100 can natively retain documentation 108 (e.g., documentation related to a particular project file). Such documentation 108 can include tag (variable name) descriptions, user-defined type descriptions, memory address comments, rung comments, text boxes (e.g., associated with sequential function charts or other graphical languages), task/program/routine/component descriptions, report formatting, custom add-in instruction help text, graphical components, embedded web pages, motion of axis description, and/or other suitable documentation. This documentation 108 can be retained in a native form such that individual components of documentation can be accessed directly.

As described in more detail below, storing the documentation 108 within the industrial controller 100 in a native form enables, amongst other things, a project file to be more easily kept current without inconsistencies associated with conventional controllers. Pursuant to an example, a developer can create a project file and generate a program therein, as well as documentation that describes all or portions of the program. The developer can then cause the project file to be downloaded to the controller 100, such that the code 106 can exist within memory 104 as well as the documentation 108 (in an uncompressed format). Thereafter, when a developer accesses the controller 100 (to alter the code 106, the data 107, and/or the documentation 108), such developer can directly make the alterations within the controller 100 (e.g., uploading of the project file is not necessary, making copies of the project file is not necessary). Rather, when the code 106, the data 107, and/or documentation 108 is altered, such alteration is reflected immediately within the industrial controller 100.

Figure 2:
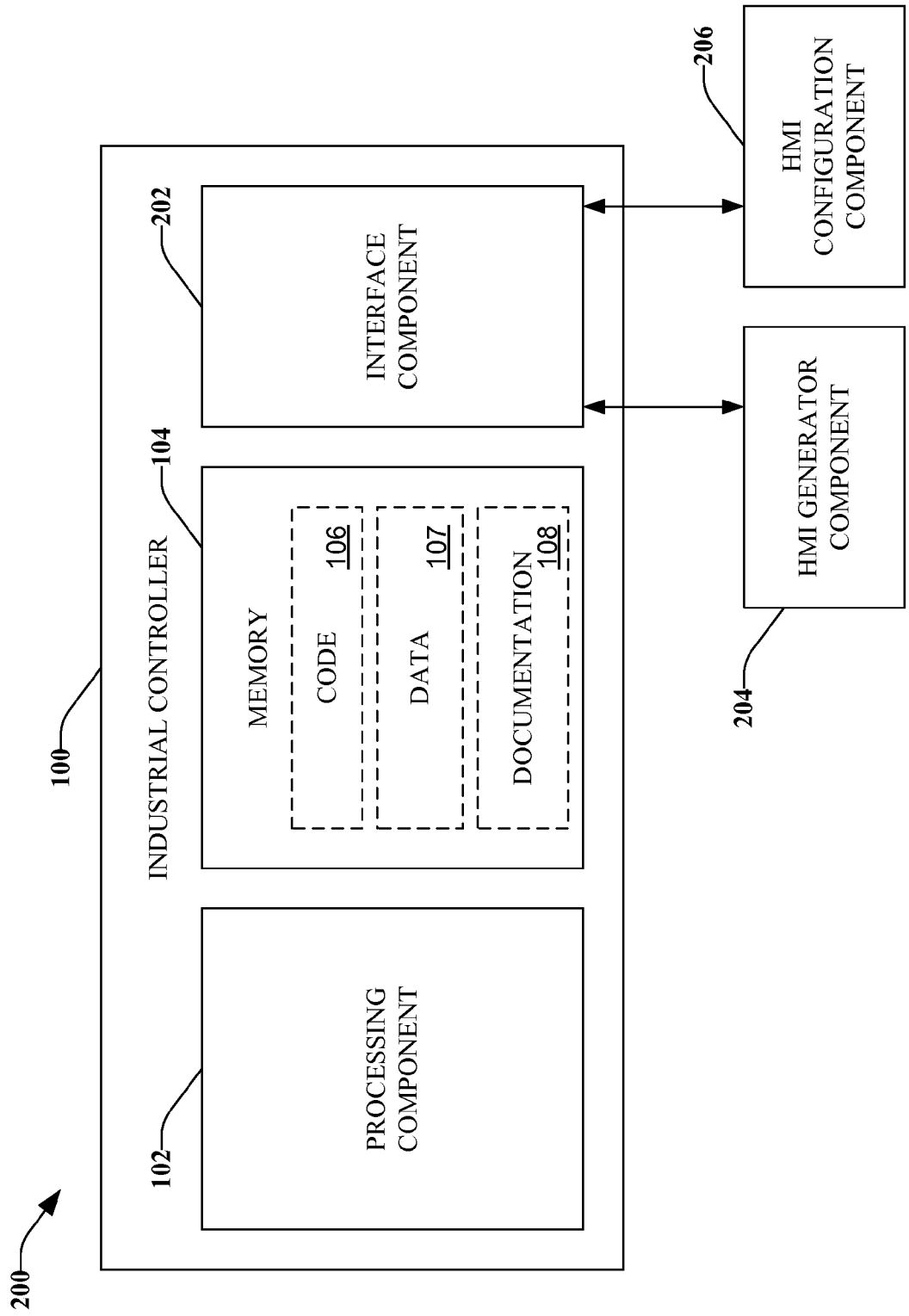
FIG. 2 illustrates an example system that facilitates creation/configuration of human-machine interfaces through utilization of documentation retained natively within an industrial controller.

Turning now to FIG. 2, a system 200 that facilitates generation and configuration of human-machine interfaces (HMIs) is illustrated. The system 200 includes the industrial controller 100, which in turn comprises the processing component 102 and the memory 104. The processing component 102 can, for instance, execute instructions (e.g., the code 106) that are retained within the memory 104. Additionally, the processing component 102 can receive data from sensors coupled to the controller 100, access certain portions of the code 106 given such data, and can drive actuators by executing the accessed portions of the code 106.

As described above, the memory 104 can additionally include the documentation 108, which can include various descriptive information relating to the code 106, portions thereof, and/or the data 107. Thus, rather than the documentation 108 being retained externally within a project file (on a personal computer, for example), the documentation 108 can be retained within the memory 104 in a form native to the industrial controller 100. Thus, individual components of the documentation 108 can be accessed directly. Pursuant to an example, a developer can select a variable and can be provided with documentation related to such variable.

The industrial controller 100 can additionally include an interface component 202 that enables the controller 100 to couple to additional components. For instance, the interface component 202 can be hardware, software, or a combination thereof. In a detailed example, the interface component 202 can be a Universal Serial Bus port and drivers associated therewith. Additionally, the interface component 202 may be an antenna and associated software that enables the industrial controller 100 to be communicatively coupled to a terminal through a wireless network. As shown with respect to the system 200, the interface component 202 can be utilized to couple an HMI generator component 204 and/or an HMI configuration component 206 to the memory 104 of the industrial controller 100.

The HMI generator component 204 can be utilized to display information to the user with respect to operations associated with the industrial controller 100. For instance, it may be desirable for the HMI generator component 204 to access information from within the memory 104 to animate an operation. In many cases, there may be strings of text that the HMI generator component 204 can desirably access in order to provide descriptive information to a developer or operator. In a detailed example, the HMI generator component 204 can have an ability to pull source code from the memory 104 of the industrial controller 100. Conventionally, when source code is pulled from the controller for utilization with an HMI, the HMI will be able to display logic, memory addresses, and in some cases tag names. Documentation relating to the logic or data, however, is not provided to the user, which can be detrimental when it is desirable to diagnose a problem in a manufacturing process. As the documentation 108 is stored natively in the memory 104, the HMI generator component 204 can (through the interface component 202) upload a list of tags, control code, data values, and description (text boxes, embedded text, etc.). Thus, the code 106 can be displayed with all variable names and description intact.

In an example, HMI maintenance operators can access a controller by way of a network and through a "view only" option can pull up source code on an HMI created by the HMI generator component 204. In other words, an HMI maintenance operator need not travel directly to the controller to perform maintenance, but can do so from any suitable location by way of a network. In contrast, conventionally the HMI maintenance operator would need to travel to an industrial controller with a laptop computer, couple the computer to the industrial controller to access such controller with the project file, and perform maintenance on the controller. Alternatively, an additional copy of a project file associated with the controller 100 can be stored on the HMI so that pertinent documentation from the file can be extracted and merged with source code uploaded from the controller. Documentation within the project file, however, may be out of date with respect to changes made to the controller and thus the HMI may display erroneous information. By storing the documentation 108 natively within the memory 104, an operator can detect a problem, contact maintenance who can review code, documentation, tag names, description in a visible and animated manner through an HMI created by the HMI generator component 204.

Operators on a factory floor can also obtain information that enables the operator to better pinpoint a problem. For instance, an operator (through an HMI) can determine that a certain variable is associated with a problem, can select such variable, and can determine that the variable is associated with a particular switch (as described in the project documentation 108). The operator can then inform maintenance that the switch needs to be replaced. In yet another example, the HMI generator component 204 can illustrate a limit sensor on a particular stream, and such sensor may be associated with a name. The operator may desire additional information relating to the sensor and a location thereof, and can select such switch on the HMI. Thereafter, descriptive information relating to the sensor (and retained within memory 104) can be displayed to the operator by way of the HMI. Accordingly, operators can be provided with additional information relating to a product being manufactured.

The HMI configuration component 206 enables HMIs to be more easily generated (with fewer steps) than current HMI configuration tools. More particularly, in order for the HMI generator component 204 to create an HMI according to information within memory 104 of the controller 100, an HMI must be developed. The HMI configuration component 206 can access tag names within the code 106 (e.g., stored within the data 107 portion of the memory 104), and there may be description (metadata) associated with such tag name to enable a user of the HMI configuration component 206 to determine function of the tag. More particularly, there are many cases when developing an HMI that strings of descriptive text are desirably accessed to provide descriptive information relating to a rung of logic, a tag, an act within a sequential function chart, etc. When a developer of an HMI is creating such HMI through the HMI configuration component 206, the developer can access the memory 104 and present a list of variable names and description associated therewith such that the developer can select an appropriate variable. Accordingly, rather than requiring an HMI developer to couple a PC (with the project file open thereon) to the controller to create an HMI, an HMI developer can access the controller from any suitable location, review descriptive text associated with variables, and configure an HMI that is to be provided to an operator.

Figure 3:
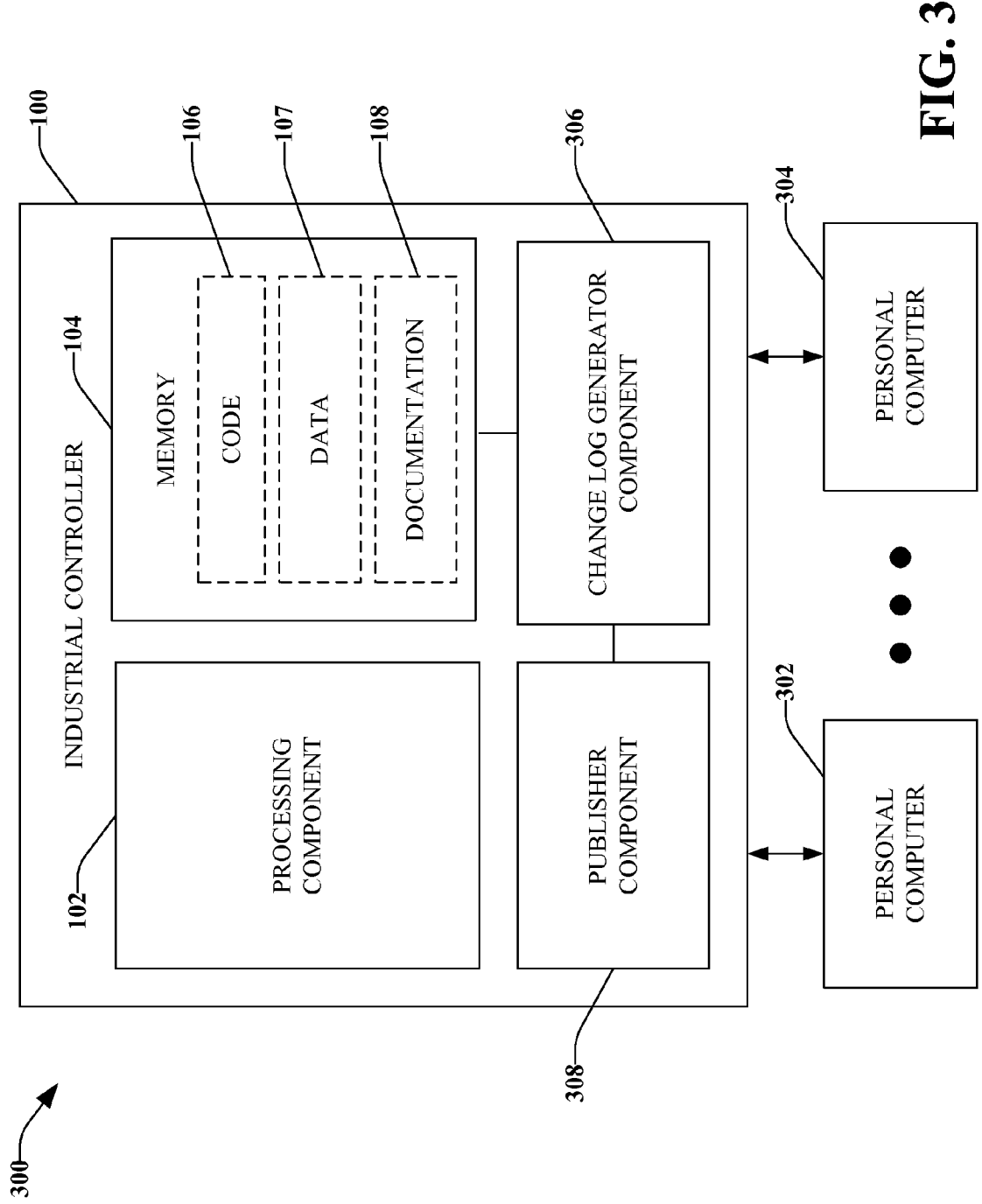
FIG. 3 illustrates an example system that facilitates updating project files on devices that are communicatively coupled to a controller.

Now referring to FIG. 3, a system 300 that facilitates updating a project file within the industrial controller 100 is illustrated. The system 300 includes the industrial controller 100, which comprises the processing component 102 and the memory 104, which function as described above. The memory 104 can include a project file, which comprises at least the code 106 that can be executed by the processing component 102, the data 107 (which can include hardware configuration, names for components/tags, etc.) and the documentation 108 that describes certain portions of the code 106 and/or data 107.

In the example system 300, multiple personal computers 302 and 304 are communicatively coupled to the industrial controller 100 and are accessing the project file stored therein. More particularly, operators associated with the personal computers 302 and 304 can be modifying the project file (the code 106, data 107, and the documentation 108). With respect to conventional industrial controllers, copies of project files must exist on the personal computers 302 and 304, and changes made to documentation are not always reflected within the industrial controller 100. In contrast, designers associated with the personal computers 302 and 304 can concurrently make changes to different portions of the code 106, different portions of the data 107, and different portions of the documentation 108. It is to be understood that while a designer is working on a certain portion of the code 106 another designer will be prohibited from working on such portion of code. Changes made to the code 106 can be stored within the industrial controller 100 as well as alterations made to the data 107 and the documentation 108. Therefore, the most current form of the documentation 108 exists within the controller 100.

In a detailed example, to ensure that designers are aware of changes being made to the code 106, the data 107, and the documentation 108, the industrial controller 100 can include a change log generator component 306, which can create a log of alterations made to the code 106, the data 107, and/or the documentation 108. While not shown, a change log created by the change log generator component 306 can be retained (at least temporarily) within the memory 104 and/or retained within an external data repository. The change log can be automatically updated with changes such that connected devices can be notified that alterations have been made (e.g., project files associated with the personal computers 302 and 304 can be updated).

To inform devices/users that alterations have been made to the code 106, the data 108, and/or the documentation 108, the industrial controller 100 can include a publisher component 308 that notifies devices associated with the industrial controller 100 that the code 106, the data 107, and/or the documentation 108 has been altered. In an example, devices that are currently connected to the industrial controller 100 can be immediately notified of an alteration by way of the change log. Therefore, for instance, if the personal computers 302 and 304 are concurrently accessing the code 106, the data 107, and/or the documentation 108 and making modifications, such personal computers 302 and 304 will be automatically notified of changes made by way of the other personal computer. Accordingly, project files on both the personal computers 302 and 304 will remain up-to-date and consistent with one another.

The publisher component 308 can be configured to automatically provide updates to the personal computers 302 and 304 or provide notifications of updates to the personal computers 302 and 304 (such that designers associated therewith should take action to receive the updates). Moreover, the publisher component 308 can cause the change log to be provided to devices that were not online at a time of alteration of the code 106, the data 107, and/or the documentation 108 once they couple to the controller 100. In an example, a change log created by the change log generator 306 can be retained within the memory 104 (which illustrates alterations made over a threshold period of time, which may be the lifetime of a project file). Once a personal computer couples to the industrial controller 100, the change log can be automatically provided thereto by the publisher component 308. The personal computer can then analyze the change log and update a project file that is retained upon the personal computer.

Figure 4:
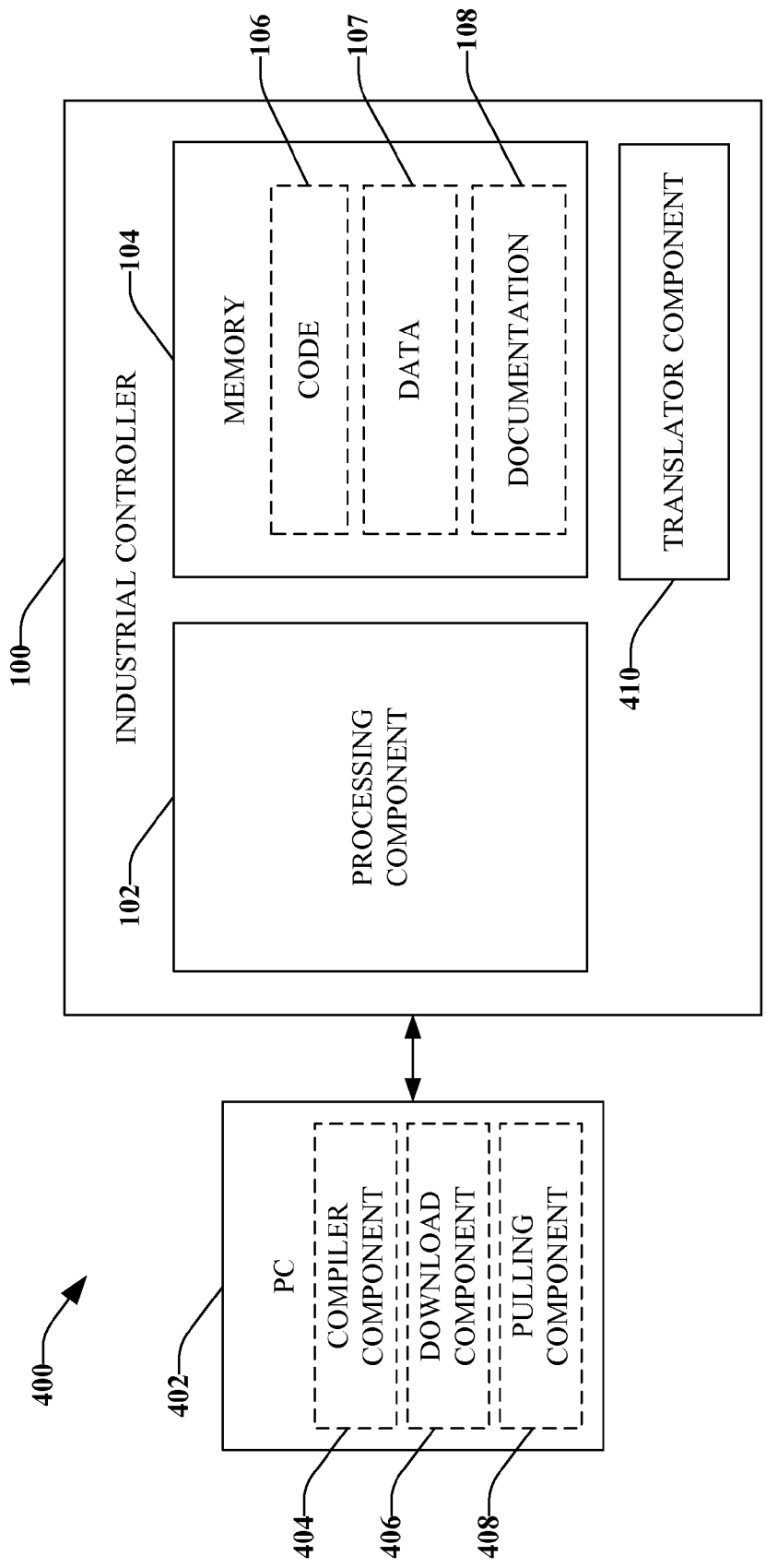
FIG. 4 illustrates an example system that facilitates downloading documentation to memory of an industrial controller.

Now referring to FIG. 4, a system 400 that facilitates providing the industrial controller 100 with code, data, and documentation for retention therein is illustrated. The system 400 includes a personal computer 402 that is utilized to create a project that is to be executed on the industrial controller 100 in connection with automating a manufacturing process. The personal computer 402 can include a compiler component 404 that can take source code generated on the personal computer and compile such source code when the personal computer 402 is coupled to the industrial controller 100. In an example, the source code compiled can be one or more of ladder logic, a function block diagram, a sequential function chart, and structured text.

The compiler component 404 can operate in conjunction with a download component 406 that is utilized to link portions of the code to certain portions of the memory 104 and load the code into the memory 104. Furthermore, the download component 406 can cause documentation to be downloaded to the memory 104, such that the documentation 108 is retained natively within the industrial controller 100. The documentation 108 downloaded to the controller 100 by the download component 406 can include but is not limited to tag or variable descriptions, user-defined type descriptions, address comments, rung comments, text boxes, task/program/routine descriptions, report formatting, custom add-in instruction help text, graphical components, motion of axis description, and HTML pages. Accordingly, the personal computer 402 can be configured to provide documentation to the memory 104 within the controller 100.

The personal computer 402 can also include a pulling component 408 that can retrieve the code 106, the data 107, and/or the documentation 108 from the memory 104 of the controller 100 such that it resides upon the personal computer 402. Thus, a project file related to the personal computer 402 can be kept up-to-date. Additionally, the pulling component 408 allows the personal computer 402 to be utilized in connection with modifying code, data, and/or documentation that previously exists upon the industrial controller 100. Pursuant to an example, the personal computer 402 can be communicatively coupled to the industrial controller 100 for a first time, and the pulling component 408 can pull information from the memory 104, thereby causing a project file to exist upon the personal computer 402. A user can then make alterations to certain portions of the code 106, data 107, and/or documentation 108, and the code 106 can be recompiled and the data 107 and the documentation 108 can be stored upon the industrial controller 100.

In one particular aspect, the documentation 108 can be retained within the memory 104 in multiple languages. For example, the code 106 and the documentation 108 may be desirably utilized in substantially similar manufacturing processes in different geographical regions. For instance, a company may have a manufacturing facility in Japan and a manufacturing facility in the United States, and the documentation 108 can exist in both Japanese and English languages. When a user accesses the documentation 108, such user can select in which language they wish code 106, the data 107, and/or the documentation 108 to be presented. Additionally or alternatively, the industrial controller 100 can determine or be provided with an indication of location, and can present the code 106, the data 107, and/or the documentation 108 in a language associated with the determined location. Moreover, the documentation 108 can be retained within the controller 100 in the form of Unicode strings, thereby enabling software such as a web browser or word processor to graphically render text in a desired language. Accordingly, the industrial controller 100 and/or the personal computer 402 can include a translator component 410 that can translate between languages to Unicode strings, enabling designers that utilize different languages to alter documentation and have such documentation stored on the controller 100 as Unicode strings.

Figure 5:
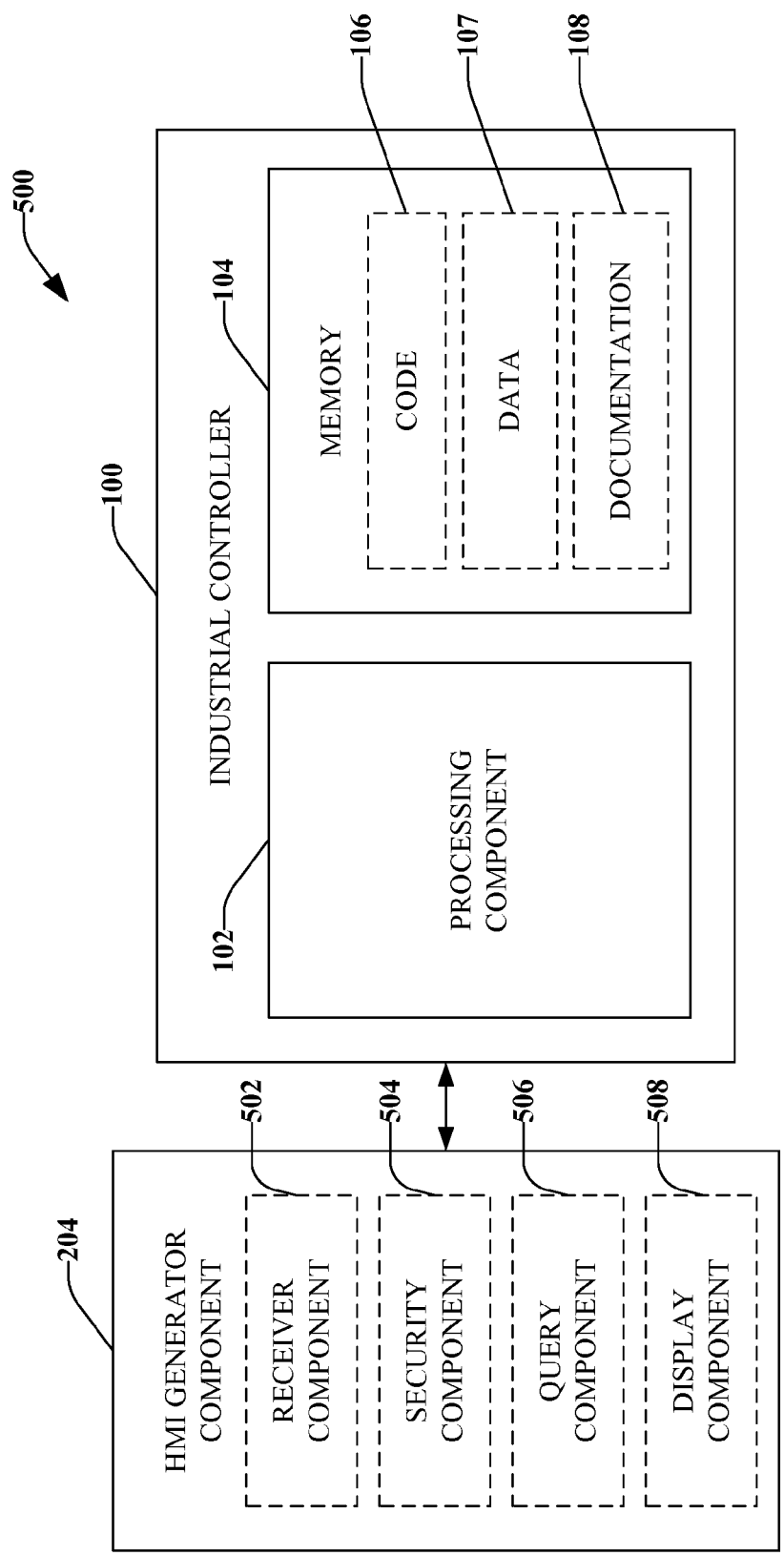
FIG. 5 illustrates an example system that facilitates generation of an HMI through utilization of documentation stored natively on an industrial controller.

Turning now to FIG. 5, a system 500 that facilitates generation of HMIs is illustrated. The system 500 includes the HMI generator component 204, which can access the industrial controller 100 to create an HMI that includes and/or is based upon the documentation 108 that is retained within the memory 104 of the controller 100. With more specificity relating to the HMI generator component 204, such component includes a receiver component 502 that receives a request to generate an HMI. For instance, the request can be received from an operator (e.g., through keystrokes, voice commands, depressing one or more graphical push-buttons, . . . ) or can be received programmatically from a computing entity. The HMI generator component 204 can also include a security component 504 that can authenticate a user identity and determine whether a user to be provided with an HMI is authorized to review data that will be within the HMI. For instance, the HMI generator 204 may be requested to generate an HMI that comprises source code and documentation. It may be desirable to restrict certain portions of a project to designers that are authorized to work on such areas. Accordingly, the security component 504 can receive information that can be employed to identify a user, such as a username, password, personal identification number, biometric indicia, and/or the like. Additionally or alternatively, the security component 504 can provide the user with security questions, wherein answers to such questions may be only known by the user. Once the user's identity is authorized, a security database (not shown) can be accessed to determine user privileges with respect to information requested to be shown on an HMI. If the user is not authorized to review requested information (e.g., code and/or documentation), the HMI generator component 204 can inform the user via a graphical user interface that the user is not authorized to review the requested information.

If it is determined that the user is authorized to generate a requested HMI, then a query component 506 associated with the HMI generator component 204 can query the memory 104 within the controller 100 for information to be displayed on the HMI. In an example, the query component 104 can access source code and the documentation 108 on the controller 100 for display on the HMI. In an example, the access to the memory 104 by the query component 506 can be programmatic in nature. The HMI generator component 204 can additionally be associated with a display component 508 that can be utilized to graphically render at least the documentation 108 to the user. For example, the display component 508 can include hardware, software, and/or a combination thereof. Thus, the display component 508 can be but is not limited to a liquid crystal display (LCD) screen and rendering software associated therewith.

Figure 6:
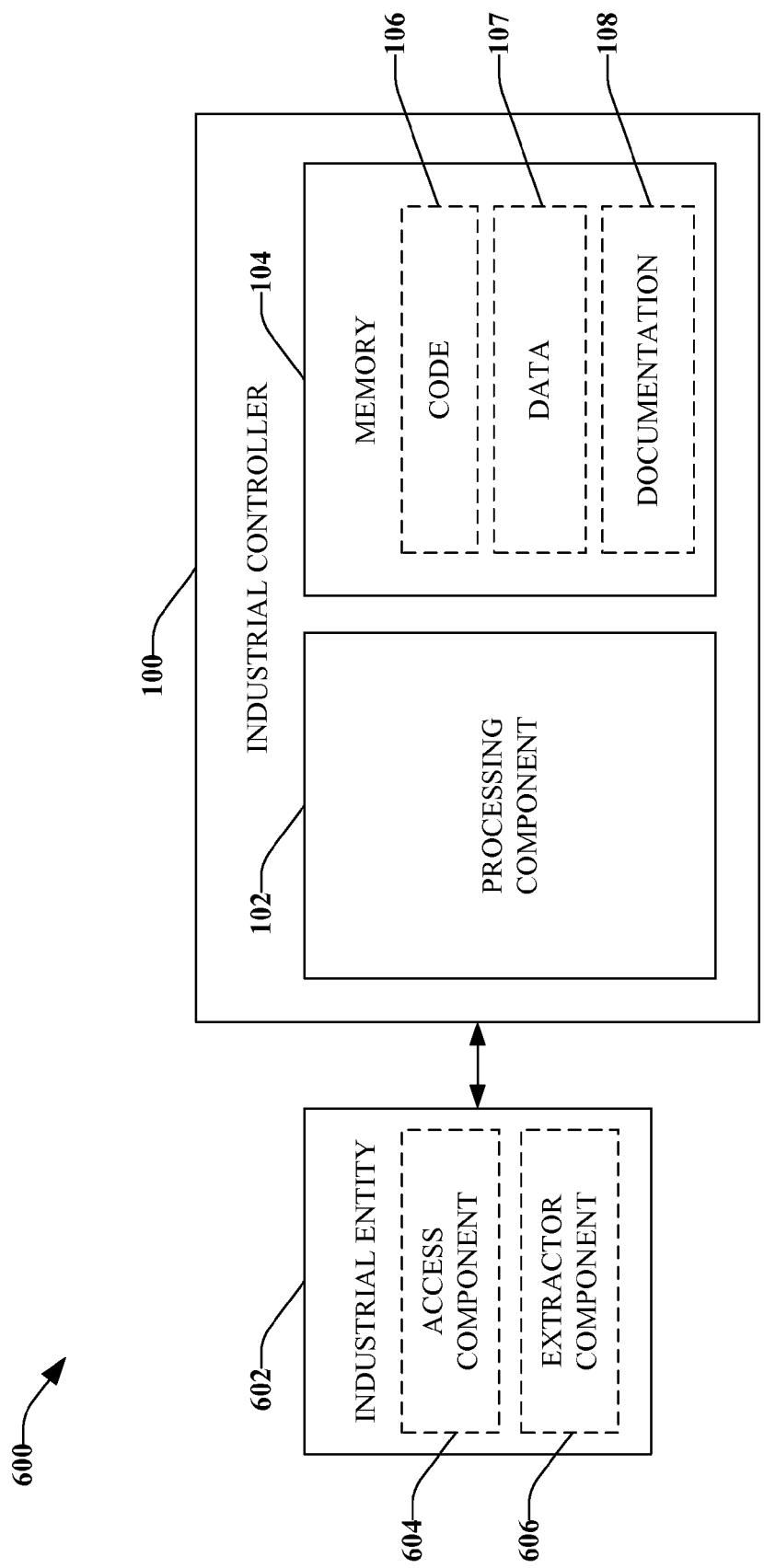
FIG. 6 illustrates an example system where documentation stored within memory is programmatically accessed.

Referring now to FIG. 6, a system 600 that illustrates programmatic access to contents of an industrial controller is illustrated. The system 600 includes an industrial entity 602 that includes software (not shown) that desires access to contents of the industrial controller 100. In particular, the industrial entity 602 can include software that programmatically accesses the documentation 108 for utilization in connection with a control application. Pursuant to an example, the code 106 can include rungs of ladder logic, and the documentation 108 with respect to particular rungs can include special character sequences that can be utilized to extract message for alarm text on an HMI. These character sequences can be accessed directly within the controller and utilized in creation of the HMI, for instance.

To enable such programmatic access, the industrial entity 602 can be associated with an access component 604 that can access contents of the industrial controller 100, including the documentation 108. The industrial entity 602 can also include an extractor component 606 that is utilized to extract documentation directly from the industrial controller 100. In an example, an instruction to obtain a system value can be utilized to extract documentation that is associated with a rung of code, a task, a routine, a structure, etc. Since such documentation is a part of executable memory, the industrial entity 602 (through use of the access component 604 and the extractor component 606) can access the documentation 108, merge particular documentation with other information or manipulate the documentation in another manner (such as paring the documentation down, adding to the documentation, etc.), and send the resultant information to another device.

In a specific example, the documentation 108 can include a serial number or vendor information string. Thus, a portion of the documentation 108 can be informative as to who created the code 106 and for what purpose the code was created. The access component 604 can access the documentation 108 and the extractor component 606 can extract particular information of interest. For instance, the extractor component 606 can determine whether such documentation was modified, and if modified execution of the code 106 can be halted. Thus, while the industrial entity 602 is shown as being external to the controller 100, it is to be understood that programs within the controller 100 can programmatically access at least portions of the documentation 108.

With more specificity relating to programmatic access to contents of the memory 104, information relating to how the documentation 108 can be programmatically accessed is provided. It is to be understood, however, that description of such access is offered as illustrative examples of some of various possible manners that the documentation 108 can be programmatically accessed. In an example, the access component 604 can be associated with instructions that request documentation with respect to a certain program component (such as a routine) by specifying the type of component to be read and a name of the desired component. For instance, the access component 604 can request documentation relating to a task that is associated with a particular task name. Thus, the instructions are hard-coded to link to a specific component. It can be ascertained, however, that a change in name of a component can result in errors when such component is called.

In another example, rather than the access component 604 being associated with instructions that recite a specific component name, the access component can specify (by way of a generic name, for instance) that documentation is desired for a previously executing component, a currently executing component, or a component that is executing a particular time in the future. Accordingly, the call to a component can be abstracted, such that when a component is renamed the instruction to receive documentation relating to the component need not be modified. Therefore, code can inherit desired documentation automatically (and hard-coded associations can be avoided).

Figure 7:
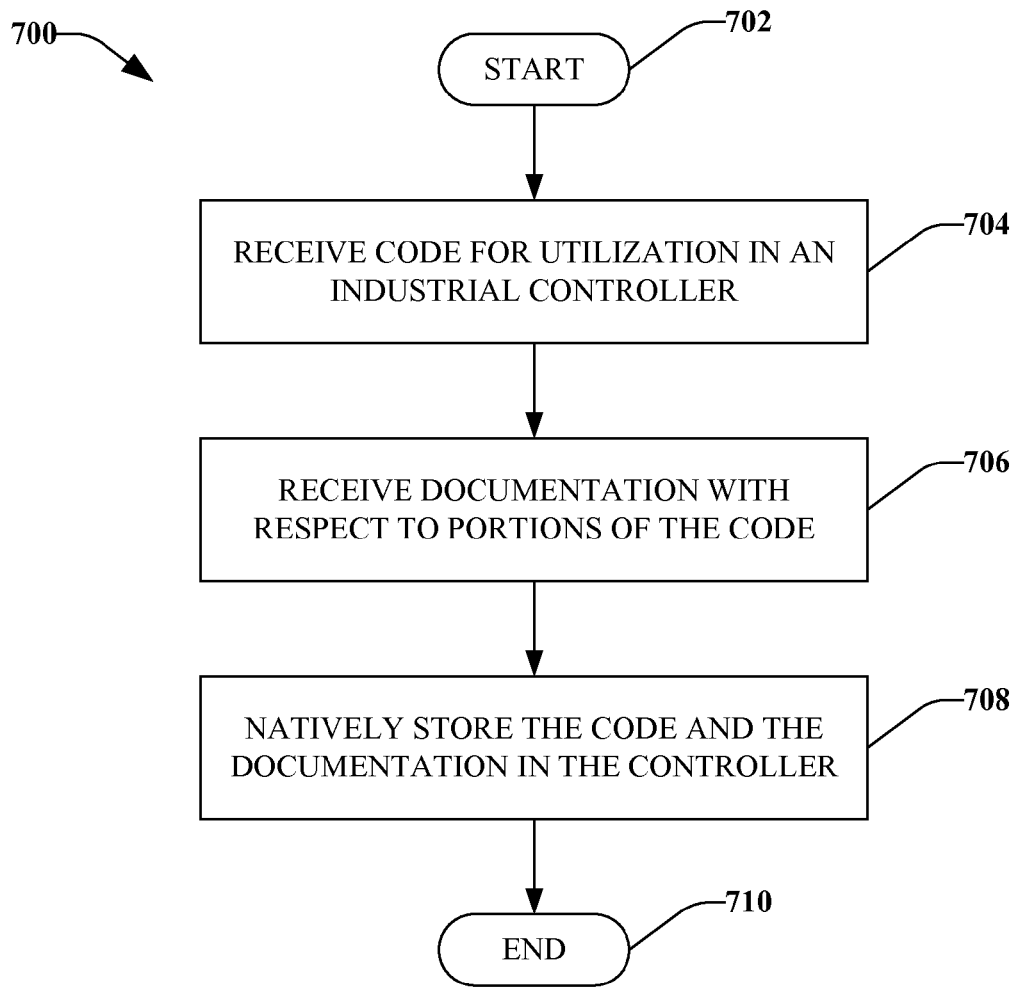
FIG. 7 is a representative flow diagram illustrating an example methodology for natively retaining documentation within memory of a controller.
Figure 8:
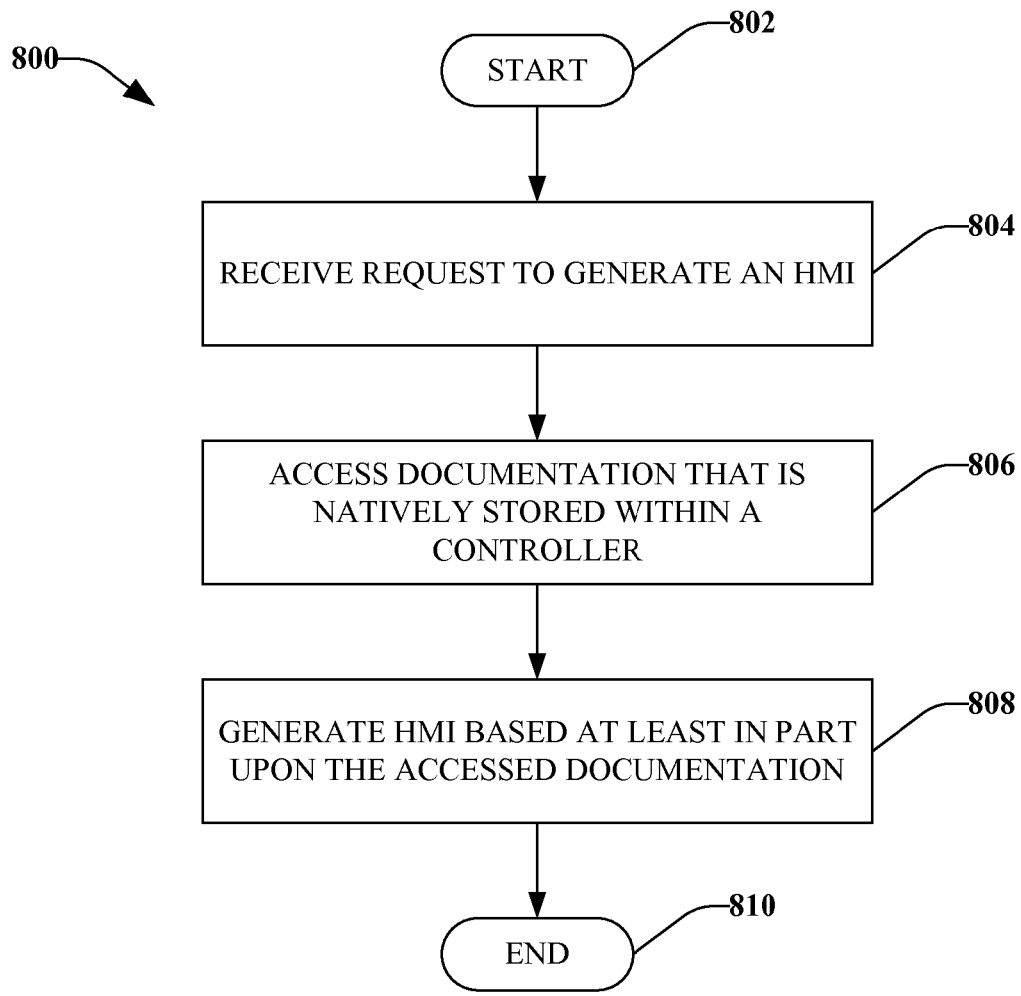
FIG. 8 is a representative flow diagram illustrating an example methodology for generating an HMI through utilization of documentation stored natively within memory of a controller.
Figure 9:
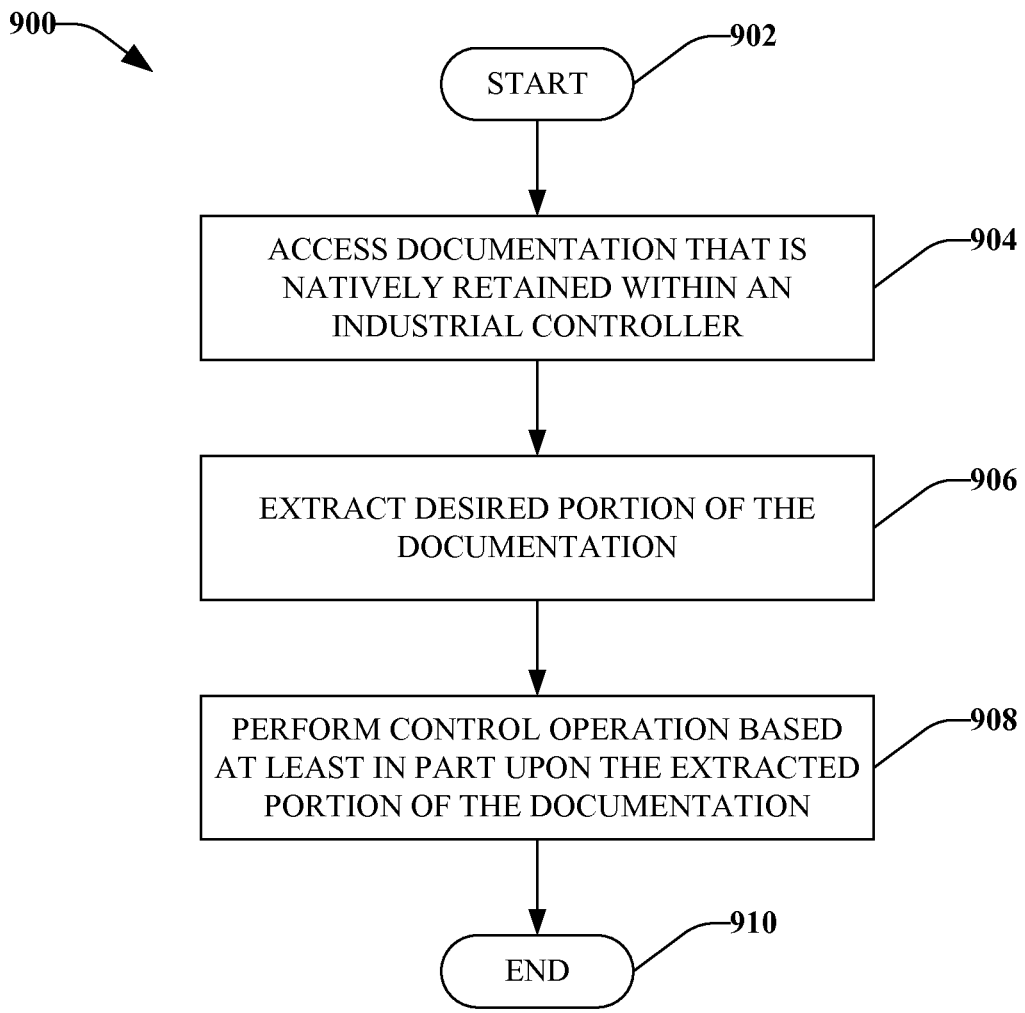
FIG. 9 is a representative flow diagram illustrating an example methodology for performing a control function based upon programmatic access to documentation on a controller.

Turning to FIGS. 7-9, methodologies relating to retaining documentation natively within an industrial controller are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for natively storing documentation within an industrial controller, such as a programmable logic controller, is illustrated. The methodology 700 starts at 702, and at 704 code for utilization in an industrial controller is received. The code can be, for instance, ladder logic, one or more function block diagrams, one or more sequential function charts, structured text (such as Basic C), a combination thereof, and/or any other suitable logic that can be executed by an industrial controller. At 706, documentation that describes the code received at 704 is received. For example, the documentation can be or include textual description associated with a rung of ladder logic, text boxes associated with graphical logic (such as a function block diagram and/or a sequential function chart), strings of text embedded within structured text, and/or the like. At 708, the code and the documentation is natively retained within an industrial controller. The methodology 700 then completes at 710.

Referring now to FIG. 8, a methodology 800 starts at 802, and at 804 a request to generate an HMI is received. The request can relate to displaying documentation stored within a controller and/or utilizing documentation to generate an HMI. Additionally, the request can be received programmatically from a particular piece of software and/or from a user. At 806, documentation that is natively stored within the industrial controller is accessed. Again, in an example, such access can be programmatic in nature. At 808, an HMI is generated based at least in part upon the accessed documentation. For instance, descriptive text can be accessed and utilized in providing an alarm to a user by way of an HMI. In another example, source code with descriptive text can be illustrated to maintenance personnel for diagnostic purposes. It is understood that the documentation can be accessed and utilized in various manners in connection with creating an HMI. The methodology 800 completes at 810.

Referring now to FIG. 9, a methodology 900 that facilitates performing control actions based at least in part upon documentation natively retained within memory of an industrial controller is illustrated. The methodology 900 starts at 902, and at 904 documentation that is natively retained within an industrial controller is programmatically accessed. For instance, the programmatic access can be from a program running external to the industrial controller (such as from an HMI). Alternatively, a program running internal to the controller can programmatically access the documentation. At 906, desired portions of the documentation are extracted (programmatically). At 908, a control operation is performed based at least in part upon the extracted portion. Control operations can include generation of alarms, creation of HMIs, alteration of an automated process, and/or any other suitable process that can be associated with an industrial automation environment. The methodology 900 then completes at 910.

Figure 10:
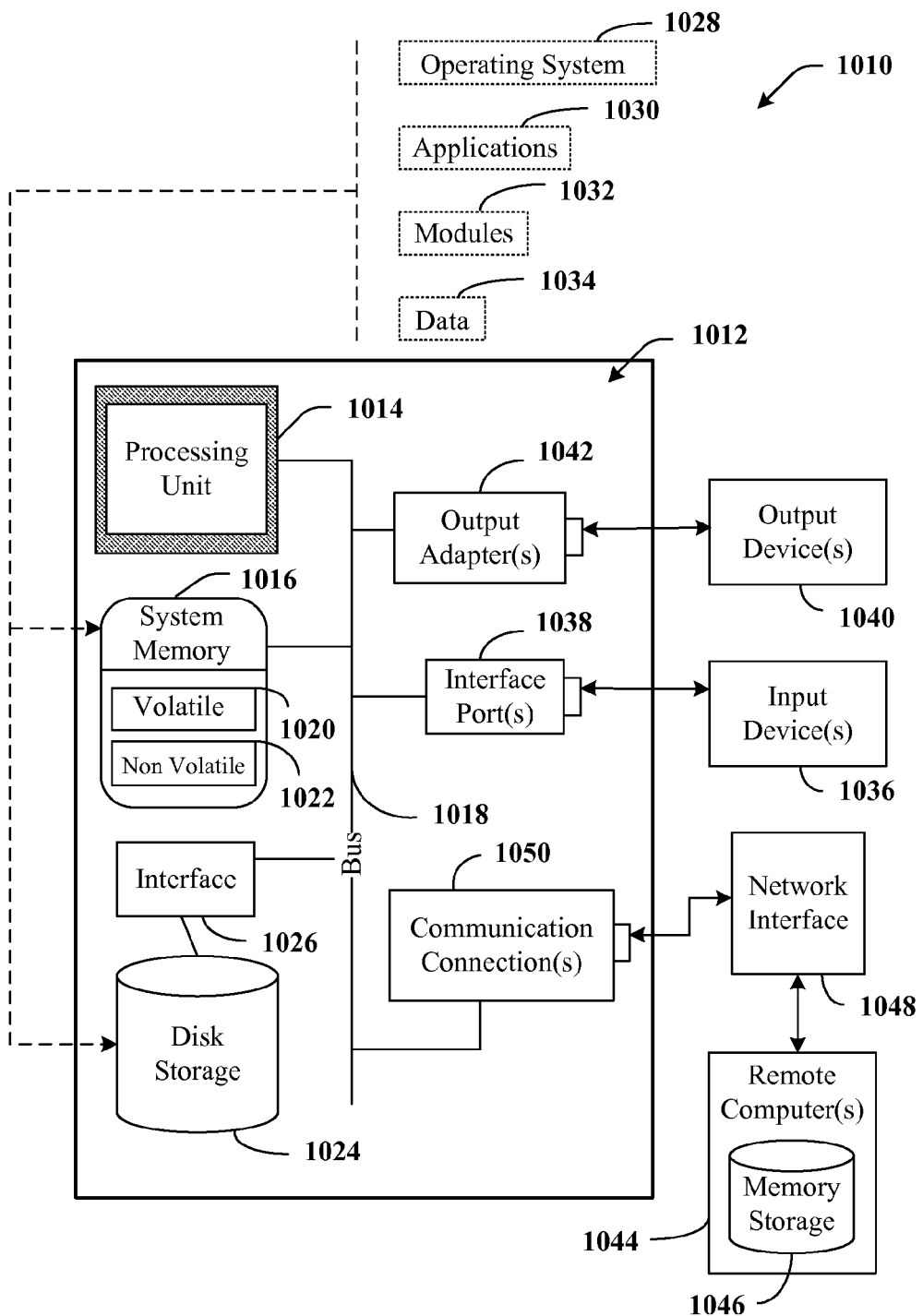
FIG. 10 is an example computing environment.

With reference to FIG. 10, an example environment 1010 for implementing various aspects of the aforementioned subject matter, including retaining documentation natively within memory of an industrial controller, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and widearea networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
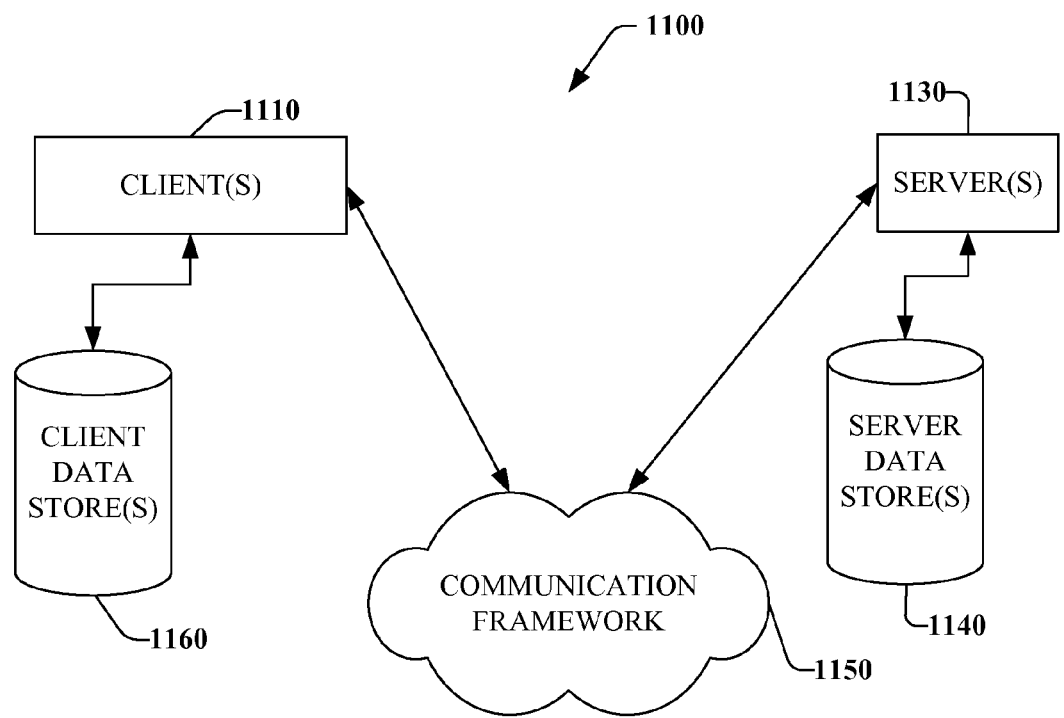
FIG. 11 is an example networking environment.

FIG. 11 is a schematic block diagram of a sample-computing environment 1100 with which the disclosed subject matter can interact. The system 1100 includes one or more client (s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the subject invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial controller comprising:
    a processor;
    a memory storing code executable by the processor to control one or more industrial control operations and storing documentation associated with the code, the documentation stored in a form that enables access to a selected portion of the documentation by an accessing entity, wherein the documentation comprises descriptive information that is user-defined and specific to at least one portion of the code;
    a translator component configured to translate the documentation from a given language to Unicode strings for storage in the industrial controller; and
    an interface component configured to provide access to the selected portion of the documentation by a human-machine interface (HMI) and visually render at least a portion of the code and the selected portion of the documentation.

2. The industrial controller of claim 1, wherein at least one of the documentation stored on the memory is synchronized by the interface component with revisions made to one or more copies of the documentation stored external to the industrial controller or one or more copies of the documentation stored external to the industrial controller is synchronized by the interface component with revisions to the documentation stored on the memory.

3. The industrial controller of claim 1, wherein the code comprises at least one of ladder logic, a sequential function chart, a function block diagram, or structured text.

4. The industrial controller of claim 1, wherein the descriptive information comprises at least one of descriptive text relating to a rung of ladder logic, a text box associated with a portion of a sequential function chart, a text box associated with a function block diagram, embedded descriptive text within structured text, tag descriptions, user-defined type descriptions, address comments, task descriptions, program descriptions, routing descriptions, custom add-in instruction help text, or motion of axis description.

5. The industrial controller of claim 1, further comprising a change log generator component configured to detect alterations to the documentation and to create a change log that describes the alterations to the documentation.

6. The industrial controller of claim 1, wherein the memory retains the documentation in multiple languages.

7. The industrial controller of claim 6, wherein the selected portion of the documentation is presented to the accessing entity in a selected one of the multiple languages based on at least one of a manual selection or location information provided to the industrial controller.

8. The industrial controller of claim 1, wherein the code programmatically accesses a subset of the documentation by specifying a name of a control component associated with the subset of the documentation.

9. The industrial controller of claim 8, the code accesses the documentation through utilization of an abstracted call to the control component associated with the subset of the documentation.

10. A method for storing and accessing program documentation, comprising:
    receiving documentation at an industrial controller, wherein the documentation comprises user specified descriptions associated with specific portions of code to be stored and executed on the industrial controller;
    translating the documentation from a given language to Unicode strings for storage in the industrial controller; and
    retaining the documentation within memory on the industrial controller to allow access to portions of the documentation associated with respective associated portions of the code;
    receiving a query from a human-machine interface (HMI) for a requested portion of the code to be displayed on the HMI; and
    providing the requested portion of the code and a subset of the documentation associated with the requested portion of the code to the HMI for display.

11. The method of claim 10, wherein the user specified descriptions comprises at least one of descriptive text relating to a rung of ladder logic, a text box associated with a portion of a sequential function chart, a text box associated with a function block diagram, embedded descriptive text within structured text, tag description, user-defined type description, address comment, task description, program description, routing description, custom add-in instruction help text, or motion of axis description.

12. The method of claim 11, further comprising:
receiving external input representing new documentation written in a selected language;
translating within the industrial controller the external input from the selected language to Unicode string format; and
storing the new documentation on the industrial controller in the Unicode string format.

13. The method of claim 10, further comprising:
programmatically accessing a selected portion of the documentation from the code; and
performing, by the code, an industrial control function based at least in part upon the selected portion of the documentation.

14. The method of claim 10, further comprising retaining the documentation within the memory in multiple languages.

15. The method of claim 14, further comprising:
receiving an external input indicating at least one of a selected language or a geographic location; and
providing the requested portion of the code in a selected one of the multiple languages based on the external input.

16. A non-transitory computer readable medium having computer executable instructions stored thereon to facilitate storing and retrieving program documentation on an industrial controller, comprising instructions for:
storing executable code and documentation associated with the executable code within the industrial controller, wherein the documentation comprises a user specified description for at least one portion of the executable code;
translating the documentation from a selected language to Unicode format for storage on the industrial controller;
receiving a request for a selected subset of the documentation from a human-machine interface (HMI);
providing the selected subset of the documentation to the HMI for visualization.

17. The non-transitory computer readable medium of claim 16, further comprising instructions for storing the documentation in the controller in a plurality of languages.

18. The non-transitory computer readable medium of claim 17, further comprising instructions for providing the selected subset of the documentation in a selected one of the plurality of languages determined according to an external input indicating at least one of a selected language or a geographic location.

* * * * *